United States Patent
Factor et al.

(10) Patent No.: US 9,411,973 B2
(45) Date of Patent: Aug. 9, 2016

(54) SECURE ISOLATION OF TENANT RESOURCES IN A MULTI-TENANT STORAGE SYSTEM USING A SECURITY GATEWAY

(71) Applicant: International Business Machines Corporation, Armonk, NY (US)

(72) Inventors: Michael E. Factor, Haifa (IL); David Hadas, Zichron Yaakov (IL); Elliot K. Kolodner, Haifa (IL); Anil Kurmus, Rueschlikon (CH); Alexandra Shulman-Peleg, Givatayim (IL); Alessandro Sorniotti, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 13/875,301

(22) Filed: May 2, 2013

(65) Prior Publication Data
US 2014/0330869 A1 Nov. 6, 2014

(51) Int. Cl.
*G06F 17/30* (2006.01)
*G06F 21/62* (2013.01)
*G06F 9/00* (2006.01)
*G06F 9/46* (2006.01)

(52) U.S. Cl.
CPC .............. *G06F 21/6218* (2013.01); *G06F 9/00* (2013.01); *G06F 9/46* (2013.01); *G06F 17/30194* (2013.01); *G06F 21/6281* (2013.01); *G06F 2221/2145* (2013.01)

(58) Field of Classification Search
None
See application file for complete search history.

(56) References Cited

U.S. PATENT DOCUMENTS

| | | | |
|---|---|---|---|
| 8,195,743 B2 | 6/2012 | Janedittakarn et al. | |
| 8,291,490 B1 | 10/2012 | Ahmed et al. | |
| 8,473,518 B1* | 6/2013 | Yancey | G06F 21/604 707/786 |
| 8,620,876 B2* | 12/2013 | Chan | G06F 17/30477 707/691 |
| 2010/0125612 A1* | 5/2010 | Amradkar | H04L 63/105 707/802 |
| 2011/0106757 A1* | 5/2011 | Pickney | G06F 17/30584 707/617 |
| 2011/0213870 A1 | 9/2011 | Cai et al. | |
| 2011/0320955 A1 | 12/2011 | O'Connor | |
| 2012/0150912 A1* | 6/2012 | Ripberger | G06F 21/80 707/786 |
| 2012/0173581 A1 | 7/2012 | Hartig et al. | |
| 2012/0215918 A1 | 8/2012 | Vasters et al. | |
| 2014/0173694 A1* | 6/2014 | Kranz | G06F 21/606 726/4 |
| 2015/0120703 A1* | 4/2015 | Sityon | G06F 21/6227 707/722 |

OTHER PUBLICATIONS

Yoon, J. P. (2011), Location- and Time-Dependent VPD for Privacy-Preserving Wireless Accesses to Cloud Services, Math/CIS Department, Mercy College, Dobbs Ferry, New York, USA.*

(Continued)

*Primary Examiner* — Jay Morrison
(74) *Attorney, Agent, or Firm* — Steven L. Fisher-Stawinski

(57) ABSTRACT

Machines, systems and methods for handling a client request in a hierarchical multi-tenant data storage system, the method comprising processing a request in subtasks, wherein a subtask is executed with a minimal set of privileges associated with a specific subtenant; extracting a claimed n-level hierarchy of a tenant and sub-tenant identities from the request; extracting authentication signatures or credentials that correspond to a level in the hierarchy; for a first level in the hierarchy, sending the request to a dedicated subtenant authenticator with privilege to validate credentials for a subtenant at the first level; and receiving a confirmation from the dedicated subtenant authenticator, whether the request is authentic.

6 Claims, 12 Drawing Sheets

(56) References Cited

OTHER PUBLICATIONS

Provos et al., "Preventing privilege escalation", In Proceedings of the 12th conference on USENIX Security Symposium—vol. 12 (SSYM'03), USENIX Association, Berkeley, CA, USA, 2003.

Takahashi et al., "Enabling Secure Multitenancy In Cloud Computing: Challenges And Approaches.", 2nd Baltic Congress on Future Internet Communication (BCFIC), pp. 72-79 2012.

Chong et al., "Multi-Tenant Data Architecture", http://msdn.microsoft.com/en-us/library/aa479086.aspx, Jun. 2006.

Bauer, Mick, "Paranoid Penguin—Secure Anonymous FTP with vsftpd", LINUX® Journal, Jul. 1, 2004, printed on Jan. 21, 2016, 8 pages, <http://www.linuxjournal.com/article/7520>.

Bernstein, Daniel J., "Some Thoughts on Security After Ten Years of qmail 1.0", CSAW'07, Nov. 2, 2007, Fairfax, Virginia, US, Copyright 2007, ACM 978-1-59593-890-9/07/0011, 10 pages.

Bittau et al., "Wedge: Splitting Applications into Reduced-Privilege Compartments", USENIX Association, NSDI '08: 5th USENIX Symposium on Networked Systems Design and Implementation, pp. 309-322.

Brumley et al., "Privtrans: automatically partitioning programs for privilege separation", SSYM'04, Proceedings of the 13th conference on USENIX Security Symposium, vol. 13, USENIX Association Berkeley, CA, USA © 2004, 17 pages.

Kilpatrick, Douglas, "Privman: A Library for Partitioning Applications", Proceedings of the FREENIX Track: 2003 USENIX Annual Technical Conference, San Antonio, Texas, USA, Jun. 9-14, 2013, © 2003 USENIX Association, 14 pages.

Murray et al., "Privilege separation made easy*—Trusting small libraries not big processes", *Proceedings of the ACM SIGOPS European Workshop on System Security (EUROSEC), Glasgow, Scotland, Mar. 31, 2008, EUROSEC 08, pp. 40-46, Copyright 2008 ACM 978-1-60558-119-4.

Radhakrishnan et al., "NetAuth: Supporting User-Based Network Services", 17th USENIX Security Symposium, SS'08, USENIX Association Berkeley, CA, USA © 2008, 19 pages.

Waizenegger Tim, "Data Security In Multi-Tenant Environments In The Cloud", Institute of Parallel and Distributed Systems, University of Stuttgart, Apr. 13, 2012, 95 pages.

Method and Apparatus for Business Activity Monitoring and Authorization in Multi-tenant Environment, An IP.com Prior Art Database Technical Disclosure, Authors et. al.: IBM, Original Publication Date: Mar. 2, 2009, IP.com No. IPCOM000179928D, IP.com Electronic Publication: Mar. 2, 2009, 5 pages, <http://ip.com/IPCOM/000179928>.

* cited by examiner

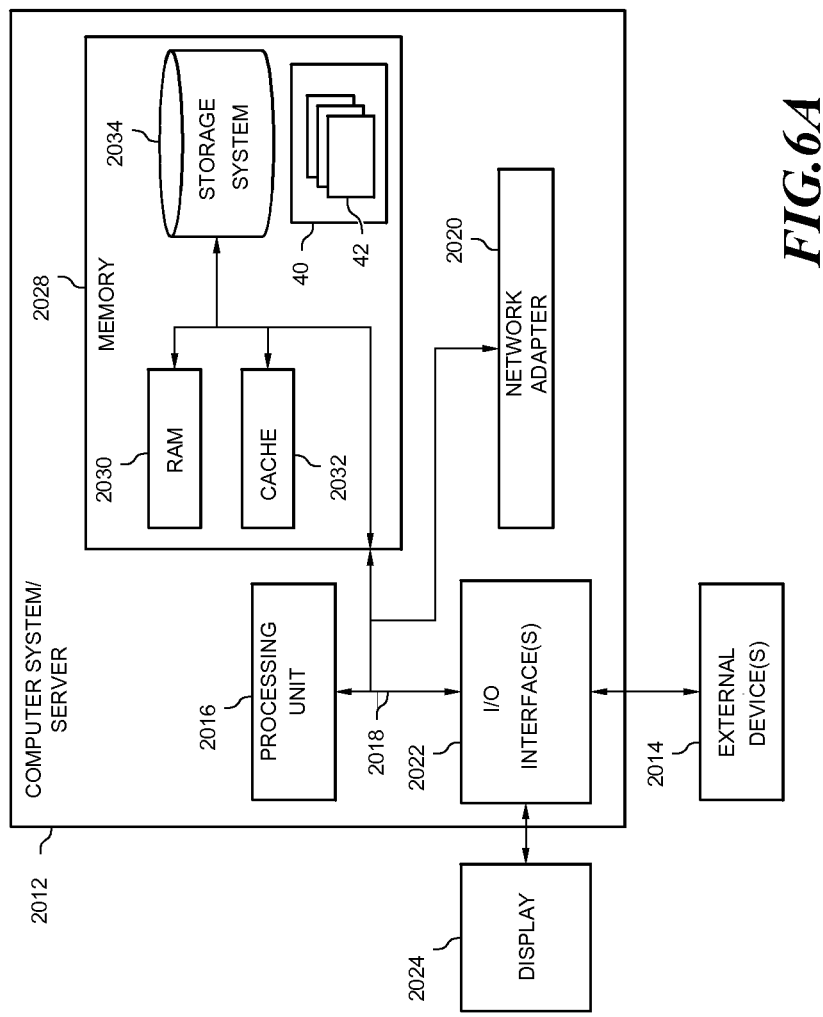

SECURE ISOLATION OF TENANT RESOURCES IN A MULTI-TENANT STORAGE SYSTEM USING A SECURITY GATEWAY

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to data storage and, more particularly, to a system and method for secure isolation of tenant resources in a multi-tenant storage system.

BACKGROUND

Virtualized storage systems provide services to archive, backup, and store data. Efficiency in a large-scale virtualized storage system (i.e., a cloud computing environment) may be achieved by serving multiple tenants using a shared pool of storage resources. Such sharing often leads to commingling of data belonging to different tenants over the shared system components (e.g., storage media, processors, etc.) and may result in system vulnerability.

In a data storage infrastructure with a traditional key-value framework, user requests for access to data are serviced based on an association established between a key (e.g., an index) and a value (e.g., a pointer to target data). Typically, a user establishes a communication session with a storage server by way of a login process and submits a data request that includes the key. The key is then utilized by the storage server to retrieve the target data from a storage medium.

The user login process authenticates the user session, but thereafter there is no further mechanism to isolate the underlying tenant resources or storage. As such, if there is a security breach, a user of one tenant might be able to access the data of another tenant. That is, there is no mechanism to define data access privileges at the file level to prohibit a user from access to a file belonging to another tenant, after the user has successfully logged in.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, machines, systems and methods for handling a client request in a hierarchical multi-tenant data storage system are provided. The method comprises processing a request in subtasks, wherein a subtask is executed with a minimal set of privileges associated with a specific subtenant; extracting a claimed n-level hierarchy of a tenant and sub-tenant identities from the request; extracting authentication signatures or credentials that correspond to a level in the hierarchy; for a first level in the hierarchy, sending the request to a dedicated subtenant authenticator with privilege to validate credentials for a subtenant at the first level; and receiving a confirmation from the dedicated subtenant authenticator, whether the request is authentic.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

FIGS. 6A, 6B and 6C depict one or more nodes and abstraction model layers in an exemplary network environment that supports a cloud infrastructure, in accordance with one or more embodiments.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following disclosure, numerous specific details are set forth to provide a thorough description of various embodiments. Certain embodiments may be practiced without these specific details or with some variations in detail. In some instances, certain features are described in less detail so as not to obscure other aspects of the disclosed subject matter. The level of detail associated with each of the elements or features should not be construed to qualify the novelty or importance of one feature over the others.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

Figure 1:
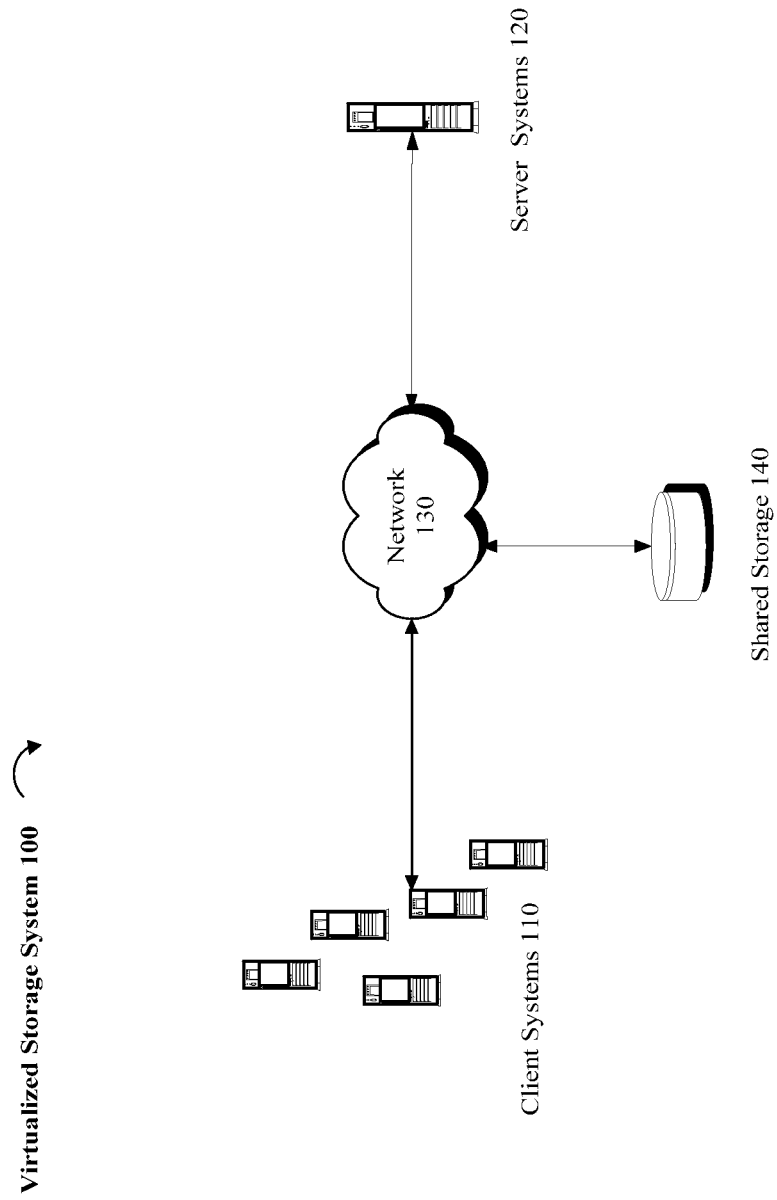
FIG. 1 illustrates an exemplary storage system wherein a virtualized server is implemented to service a plurality of requests, in accordance with one embodiment.

Referring to FIG. 1, in accordance with one embodiment, a virtualized storage system 100 may be implemented to achieve economies of scale by serving multiple customers or tenants from a shared pool of resources (e.g., server systems 120, shared storage 140, etc.), where each tenant (e.g., company, enterprise, or similar entity) may be considered as a client of the virtualized storage system 100. The term client as used herein is intended to be construed generally, so as to encompass a tenant, a computing device (e.g., client systems 110), a user of the device, or a combination thereof.

Resource sharing schemes may be utilized to enable load balancing, homogeneity for management and high utilization rates. Sharing of resources in the virtualized storage system 100 may be achieved by pooling physical resources, including physical storage media and storage servers that control the media into a framework that we refer to here as multi-tenancy. In this framework, if all physical resources are pooled together, a client system 110 may access data from multiple resources, where serve systems 120 are implemented to service a plurality of requests submitted by one or more clients systems 110.

Shared storage 140 may be classified by the way data is addressed and may include block storage systems, application-specific stores, key-value stores, object stores, etc. Depending on implementation, shared storage 140 may be directly attached to server systems 120 or remotely accessible over communications network 130, or both. Communications network 130 (e.g., the Internet) may be used to connect the various network components in a distributed storage environment, in which data or data files may be stored on one or more storage devices using redundancy to support file recovery in case of server errors or failures.

The client systems 110 may include, for example, a desktop, laptop or palmtop personal computer, a mobile telephone, a personal digital assistant (PDA), a wireless email device, a workstation, a kiosk, a television set-top box, a game console, or more generally any type of information processing device from which a user may wish to store or access data stored over the virtualized storage system 100. A server system 120 may be implemented as a computer or other stand-alone processing platform, or may be distributed over multiple processing platforms comprising multiple separate computers.

The network 130, by way of example referred to as the Internet in the following, may comprise a wide area network (WAN), a local area network (LAN), a satellite network, a telephone or cable network, or various portions or combinations of these and other types of networks. It is to be appreciated that a given embodiment of the virtualized storage system 100 may include multiple instances of computing client systems 110 and server systems 120 that may be utilized to manipulate data stored in the shared storage 140.

Figure 2:
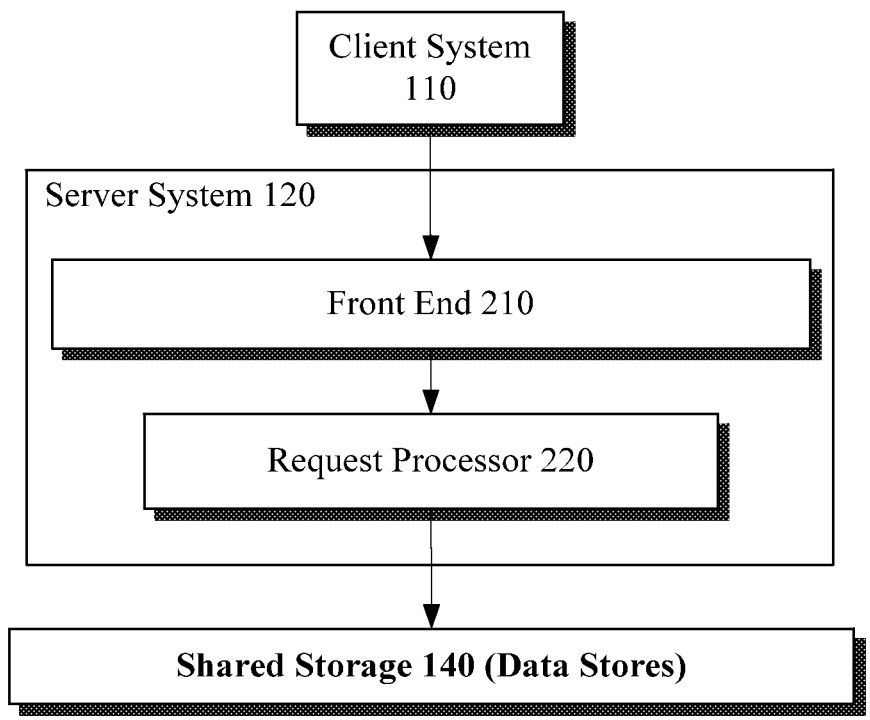
FIG. 2 generally illustrates an exemplary security mechanism, in accordance with one embodiment.

Referring to FIG. 2, in one embodiment, to alleviate multi-tenancy security concerns stemming from the storage of different tenants' data in the shared storage 140, a security mechanism 200 may be implemented, where a front end 210 authenticates and authorizes a request submitted by a client system 110, prior to executing the request. As shown in the simplified illustration in FIG. 2, a client system 110 may issue a request communicated to a front-end 210 component of a server system 120. Upon receipt, the request is passed on to a request processor 220, which accesses (e.g., reads or writes) the requested data on shared storage 140.

Request processor 220 may access a supplementary data structure or database, such as a distributed key-value store, to retrieve access, privilege or authentication information associated with target data. As provided in further detail below, proxy components may be provided to handle security-related tasks such as authentication, authorization, and access control enforcement. For example, in one implementation, a key-value request processing architecture is provided in which a client request is processed by a request processor 220 having limited access privileges, so that a client request is not permitted to run with global privileges to access data belonging to unrelated users or tenants.

To maintain a secure system and to limit the noted vulnerabilities, a secure multi-tenancy model 300 is provided (see FIGS. 3A and 3B) to allow pooling of shared resources by incorporating a set of principles for safe logical isolation. In one implementation, the added security may be achieved by isolation across tenants based on a principle of least privilege, for example, where each system component runs with the least set of privileges needed to service a request or the least set of privileges needed to complete an intended task. Without limitation, such privileges may be designed to be tenant-specific, in accordance with one or more embodiments.

For example, separate privilege classes may be defined to access authentication material specific to different tenants so that a possible breach is limited to a single tenant. In one embodiment, a distributed non-dedicated data storage environment is provided that may include one or more data storage servers implemented to serve multiple tenants. Storage resources (e.g., storage media, communication bandwidth, processing power, etc.) may thus be allocated to different tenants based on different criteria (e.g., negotiated terms of service). The different tenants may be enterprises with competing interests.

The secure multi-tenancy model 300 may thus service a number of entities and users who may login through a process that requires the user to provide a set of credentials to gain access to target data. Users may be associated with one or more tenants. In a simple example, a hierarchy may be defined where each user is associated with a single tenant. As provided in further detail below, the secure multi-tenancy model 300 may be generalized to more complex n-level hierarchies involving multiple users or sub-tenants 120.

Figure 3A:
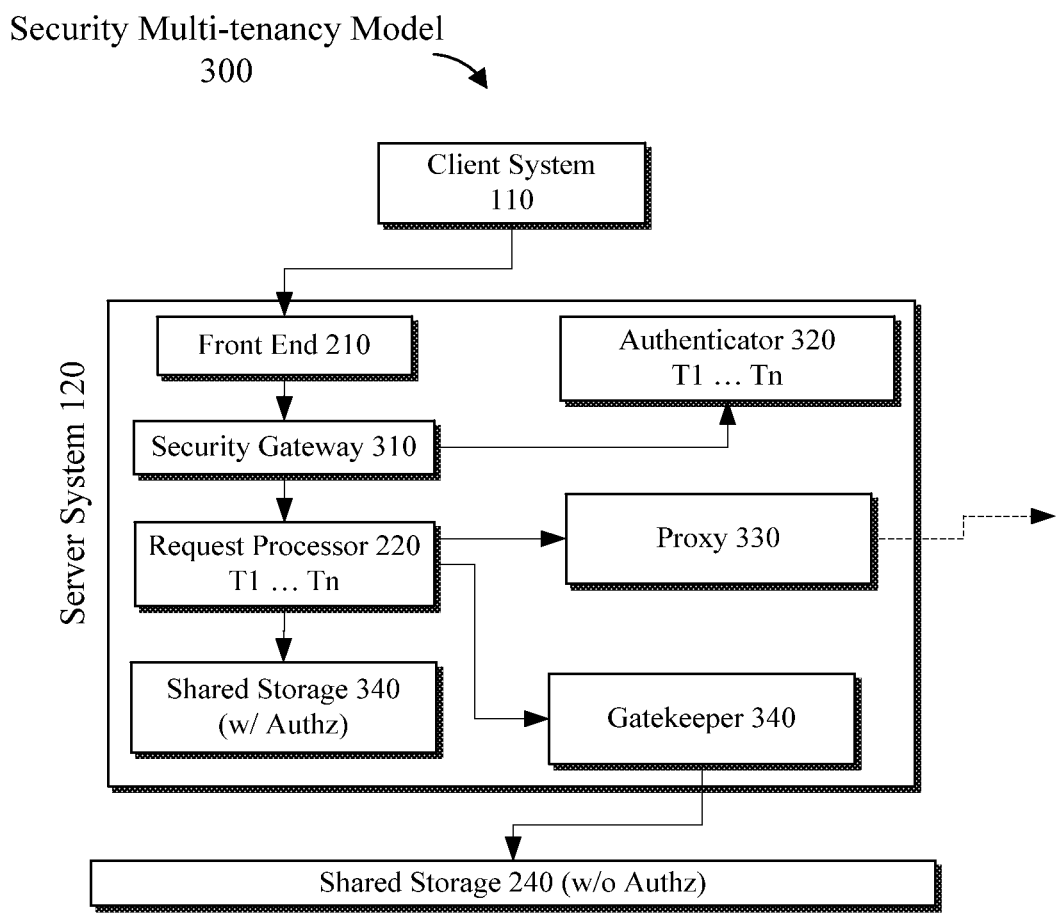
FIGS. 3A and 3B illustrate exemplary block diagrams of a secured multi-tenancy model for a virtualized storage system, in accordance with one embodiment.
Figure 3B:
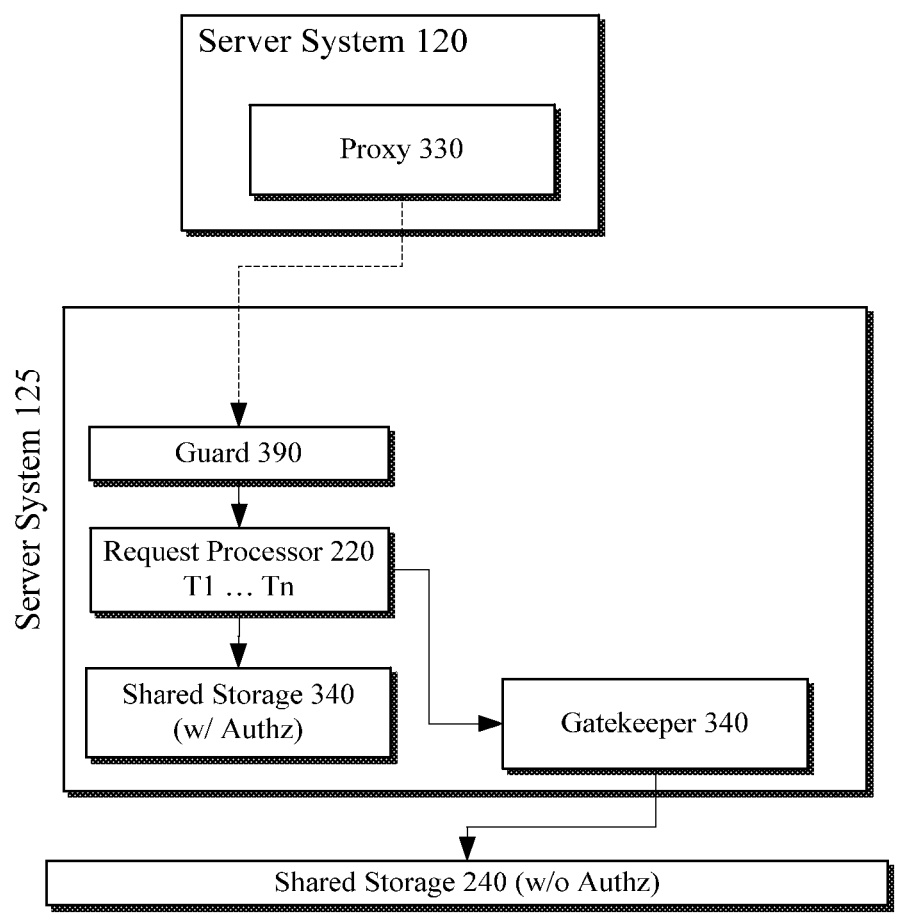

Referring to FIGS. 3A and 3B, in one embodiment, a server system 120 may include: (1) a security gateway 330, which splits the execution of a client request into subtasks with a set of tenant-specific privileges, (2) a gatekeeper 340, which prevents access to shared resources by unprivileged users or tasks, and (3) a proxy 330 in communication with a guard 390. The above components may be utilized to maintain tenant identity and privileges across processes that may be distributed among multiple server systems 120. A tenant authenticator 320 may be optionally provided to authenticate the users submitting a request via client system 110 and their tenant belonging, before request processor 220 executes the request.

Security Gateway

Figure 4A:
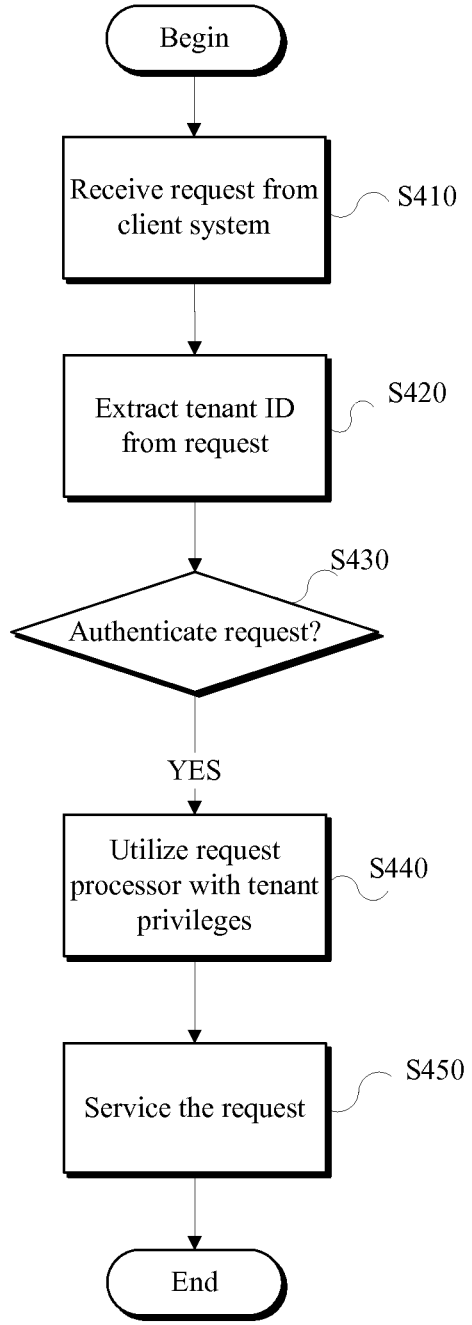
FIGS. 4A through 4C illustrates exemplary flow diagrams of one or more methods of implementing a secured multi-tenancy model for a virtualized storage system, in accordance with one embodiment.

Referring to FIGS. 3A and 4A, the security gateway 310 may be implemented on server system 120 to receive a request submitted by a client system 110 (S410). The security gateway 310 may be configured to extract a tenant ID claimed by the client system 110 from the request (S420). The request may be authenticated to verify that the request was submitted by a user associated with the identified tenant (S430). If so, security gateway 310 utilizes a request processor 220 with appropriate restricted privileges (S440) allowing to access the required tenant's data in order to service the request (S450). In one embodiment, a request may be received by front end 210, which delivers the request to a security gateway 310. As provided in further detail below, the security gateway 310 controls the privileges assigned to the request processor 220 for the purpose of servicing the request while the request processor 220 has no control over the privileges it owns.

As provided in further detail below, the security gateway 310 may be implemented to determine the credentials used to serve a submitted client request. Once the credentials are decided, the security gateway 310 assigns one or more request processors 220 to serve the request. Before a request processor 220 starts serving the request, the security gateway 310 associates the request processor 220 with the privileges needed to perform the task and avoids associating the request processor 220 with privileges not required to perform the said task. The request processor 220 is than restricted to use privileges assigned to it by the security gateway 310. After servicing the request, the request processor 220 may be tasked with additional requests requiring the same or more limited privileges. However, in one embodiment, the privileged may not be extended to privileges not previously assigned to the request processor 220.

To prevent a client of one tenant from accessing the authentication system of another tenant, the security gateway 310 may identify a request according to a tenant ID associated with the request and forward the authentication data (e.g., user identification data: username, password) associated with the request to an authenticator 320 associated with that tenant. Authenticator 320 may be implemented to reference a data structure (e.g., a lookup table) to determine a set of privileges for a specific tenant based on the tenant ID associated with the request. If the authenticator 320 is able to authenticate the request base on the tenant ID and the authentication data, request is processed, otherwise the request is rejected. The authenticator 320 may optionally establish dedicated communication channels (e.g., sockets) with multiple authentication systems corresponding to multiple tenants, so that authentication requests associated with different tenants are submitted through separately established and dedicated communication channels, for example.

In one embodiment, an n-level hierarchy for tenant and sub-tenant identities may be associated with a request submitted to security gateway 310. In this scenario, security gateway 310 may extract the authentication data or credentials that correspond to each level in the hierarchy from the respective requests. In one example, if there are "n" tenants then "n" authenticators 320 may be utilized to authenticate requests submitted by each tenant in a dedicated manner. Thus, for a level in the hierarchy, security gateway 310 may send a request to a dedicated tenant authenticator 320 (or a sub-tenant authenticator) to validate credentials for that tenant, and confirm the credentials to the security gateway 310.

An authenticator 320 may be implemented to authenticate a request by verifying the validity of the request parameters and the authentication credentials extracted from the request by security gateway 310. Extracting tenant and sub-tenant identities from a request may be performed through encoding the tenant information (e.g., tenant ID) in HTTP authentication headers for a submitted request. In one embodiment, tenant information may be passed as part of the uniform resource locator (URL) of the resource which the client requests to access. Optionally, the security gateway 310 may split the authentication process to subparts, where a sub-process corresponds to a certain level of the tenant hierarchy.

In one embodiment, authentication data or credentials corresponding to the different levels in the hierarchy may be generated in the form of concatenated signatures by concatenating a unique tenant signature to the user password, for example, and passing the concatenated signature as part of the user password field (e.g., if using an HTTP authentication method). As such, upon receiving a request, the security gateway 310 may extract the signature of a tenant or sub-tenant at the corresponding hierarchy level and pass the signature to an authenticator 320 spawned for the respective level in the hierarchy. The signatures may be calculated with a cryptographic hash function (e.g., HMAC), based on the user password and a shared key associated with the corresponding sub-tenant level. The length of a signature of each level may be predefined to allow for the separation of the signatures belonging to the different levels.

As noted earlier, ultimately, when a request is successfully authenticated, authenticator 320 hands off the processing back to the security gateway 310 which may later pass it to request processor 220 to be further processed. In one implementation, the security gateway 310 may be configured to submit an authenticated request to request processor 220 which may utilize a worker thread to process the request, as provided in further detail below. Accordingly, depending on implementation, request processor 220 may be given access to resources and content stored on server system 120 or available via server system 120, according to the authenticated privileges of the tenant or credentials of the user associated with the request.

In one example embodiment, a request processor 220 may be implemented by a process running with a pre-assigned operating system (OS) user ID that has limited privileges to process a submitted client request. As an example, the OS user ID used by the process serving as request processor 220 may be derived from a tenant ID of the request, where different tenants would have different OS user IDs assigned to them in the system. A tenant ID or the respective OS user ID may be used to determine the privileges of a process servicing the request for the specific tenant. If a system resource under the OS may be accessed via the OS user ID associated with a tenant, and if the a request processor 220 uses an OS process running with the corresponding OS user ID, then the request processor 220 will have the privileges for accessing that resource. Accordingly, the particular privileges associated with request processor 220 may be determined by the OS user ID associated with the process used by request processor 220.

Accordingly, in one embodiment, to avoid unauthorized access, once a security gateway 310 determines a tenant's privileges, the request processor 220 assumes the privileges of the particular tenant for the purpose of servicing the request associated with the tenant. If so, the request processor 220 may no longer be used or assigned to serve a client of another tenant. The assumed privileges may be determined according to the identity and credentials of the respective tenant associated with the request, the respective user associated with the request, or both. As noted in further detail below, servicing of a single user request may be performed by several worker processes.

Security gateway 310 controls a request processor 220 privileges to prevent the request processor 220 from having a relatively high level of access to content and resources to an extent that request processor 220 may pose an adverse threat to the security of the server system 120. For example, to successfully service a request, a request processor 220 may be needed that has privileges to access contents A, B and C and resources D, E and F. The security gateway 310 instead of utilizing a request processor 220 with access privileges to all A, B, C, D, E, and F, may utilize six separate request processors 220, where an individual request processor 220 has exclusive privileges to access a single one of A, B, C, D, E, or F, for example.

Security gateway 310 may introduce privilege separation by splitting a request into subtasks, executing a subtask under a dedicated ID that corresponds to specific privileges of a specific tenant. As such, a request submitted by a user associated with a tenant may be sent to one or more request processors 220, where a corresponding request processor 220 has a dedicated specific privilege for accessing a respective set of tenant (or sub-tenant) resources. A request processor 220 may also be implemented by a worker thread executing with a proper OS user ID that may have proper privileges to process a subtask of the request. The access privileges may be used to determine which resources and content a worker thread will be able to access. In this manner, cross-tenant leakage and unauthorized access to storage resources may be contained.

In summary, in a multi-level multi-tenant storage system, the security gateway 310 may be implemented to parse the incoming requests and verify the requests' validity by way of dedicated tenant authentication processes, having a limited set of privileges for a level in the tenant hierarchy. An identifier may be provided that corresponds to the relevant tenant and has the permissions to perform authentication for an identified level so that the spawned process performs the authentication at the corresponding level. At tenant level, the security gateway 310 may extract the corresponding authentication data and pass the data to authenticator 320 spawned for that level.

Once a request is successfully authenticated, the security gateway 310 controls the execution of the request by passing the relevant subparts to a set of dedicated request processors 220 with privileges to perform the particular subtask. Security gateway 310 may either limit or change the permissions of an already running process or may spawn a new process with limited privileges. The security gateway 310 may use an operating system mechanism, such as an access control list (ACL) or OS level user IDs to ensure the end-to-end isolation of the tenant resources. The identifiers of the tenant processes may be used to allow the operating system control access to the tenant resources.

Gatekeeper

Figure 4B:
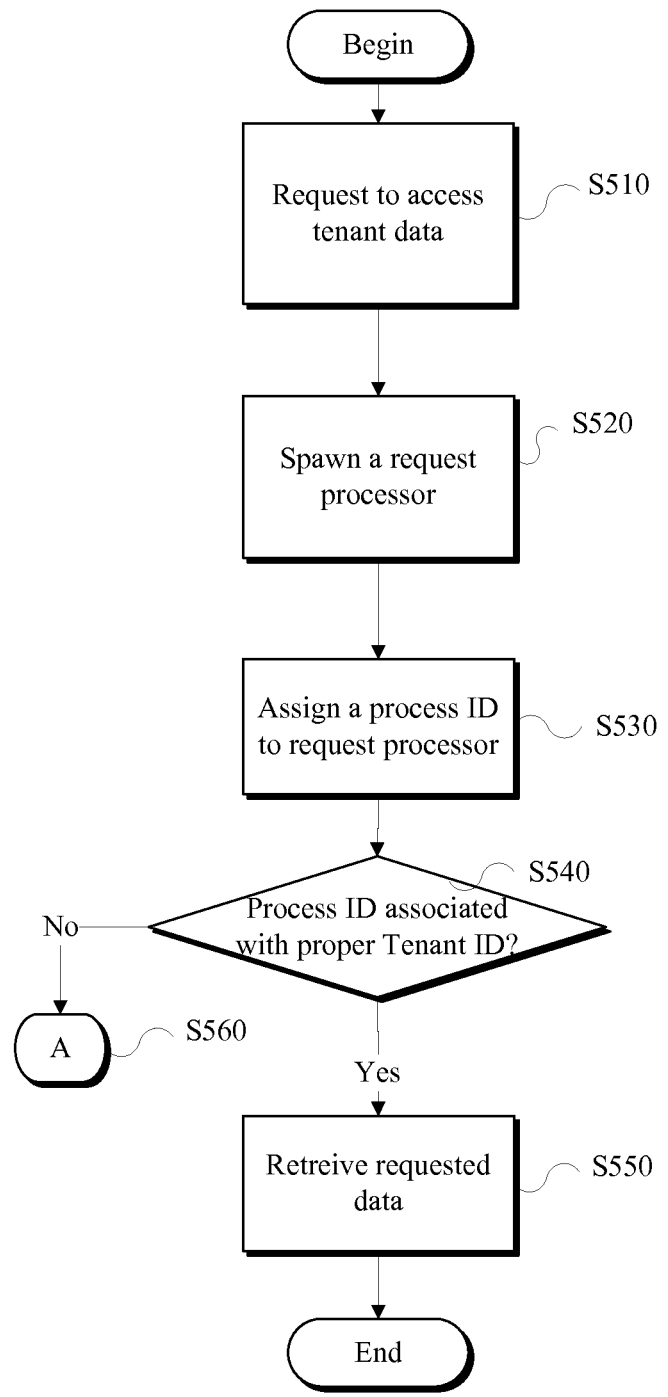

Referring to FIGS. 3A and 4B, a gatekeeper 340 may be implemented to prevent unauthorized access to the tenant data stored on shared storage 240. A client system 110 may submit a request to sever system 120 to access tenant data stored on shared storage 240 (S510). Server system 120 starts executing the request received at the front end 210, which passes the request to the security gateway 310. The request may include a tenant ID associated with the tenant to which a client system submitting the request belongs. The security gateway 310 may spawn a request processor 220 (S520) and assign a process identifier (i.e., process ID) to the spawned request processor 220 (S530). The assigned process ID may be the same as (or derived from) the tenant ID associated with the requesting client. Request processor 220 may be assigned to service the request to retrieve target data (identified in the client request) from shared storage 240.

Based on the information included in the request assigned to the request processor 220, request processor 220 may submit a request to access data or parameters stored on a shared storage 240. In one implementation, the request may be intercepted by gatekeeper 340. Gatekeeper 340 may be implemented to limit access to tenant data stored on shared storage 240 by verifying that the request submitted by request processor 220 is associated with a tenant that is authorized to access the target data. To accomplish this, in one embodiment, gatekeeper 340 verifies that the process ID of the request processor 220 that submitted the request is associated with (e.g., matches) the proper tenant ID associated with the requested data (S540).

For example, metadata associated with the target data may be examined to determine a tenant ID associated with the target data and based on the associated tenant ID determine the tenant to which the target data belongs. This meta data may be private, carefully protected and unforgeable. If the process ID of the request processor 220 correlates with the identified tenant ID for the target data, then gatekeeper 340 retrieves the requested tenant data and passes the data to request processor 220 (S550). Otherwise, access is denied or other remedial measure is taken (S560). Once the gatekeeper 340 has verified that a data request submitted by a request processor 220 is associated with a particular tenant, request processor's 220 access to data stored on a target resource may be limited to the particular tenant.

In one implementation, the gatekeeper 340 limits a request processor 220 access to a shared key-value data store, where keys and values are correlated with the identified tenant, so that access is limited to data associated with the particular tenant. Keys and values may be correlated with an identified tenant by isolation of the key space of the different tenants. In one embodiment, a tenant ID (or an identifier calculated from a tenant ID) may be added to the key by the gatekeeper 340 (or by the process handling the request and verified by the gatekeeper 340), when a key is accessed by the process. The key may be verified by the gatekeeper 340 before or during returning a response to a read or list operation, for example. In another embodiment, the gatekeeper 340 may add a tenant ID (or an identifier calculated from a tenant ID) to the key before accessing the key at the underlying key-value sub-system and optionally remove them before delivering the keys to the request processor 220.

Request processor 220 may also sign or encrypt the request, using a key known to the gatekeeper 340 as associated with a specific tenant. Request processor 220 may submit the data request to gatekeeper 340 via a UNIX domain socket mechanism. A UNIX domain socket provides a communications endpoint for exchanging data between processes in which the receiving process may learn the true privileges associated with the sending processes such that Gatekeeper 340 may learn the privileges owned by the sending request processor 220. Alternatively, in order for the gatekeeper 340 to learn the privileges owned by the sending request processor 220, the request processor 220 may sign or encrypt the request, using a key known to the gatekeeper 340 as associated with a specific tenant or with a specific privilege. When using Linux domain sockets, for example, an SCM CREDENTIALS mechanism allows getting the tenant identifier as the credentials of the process sending the request.

In summary, in a key-value data storage framework used for the shared storage 240, in order to limit access to data per tenant, the keys under which data is stored may be isolated by the gatekeeper 340 by way of labeling the keys associated with a particular tenant's data with a unique value (e.g., a tenant ID). When integrity and confidentiality are also important, the keys may be cryptographically signed or encrypted. The values stored under said keys may also be signed or encrypted according to a selected level of protection. To prevent any backdoor attacks, data access requests that do not go through the gatekeeper 340 are blocked. As such, the gatekeeper 340 may limit a tenant's access exclusively to that tenant's own key and values, preventing cross-tenant data leakage and malicious modifications of the stored keys and values.

Inter-Server Communication

Figure 4C:
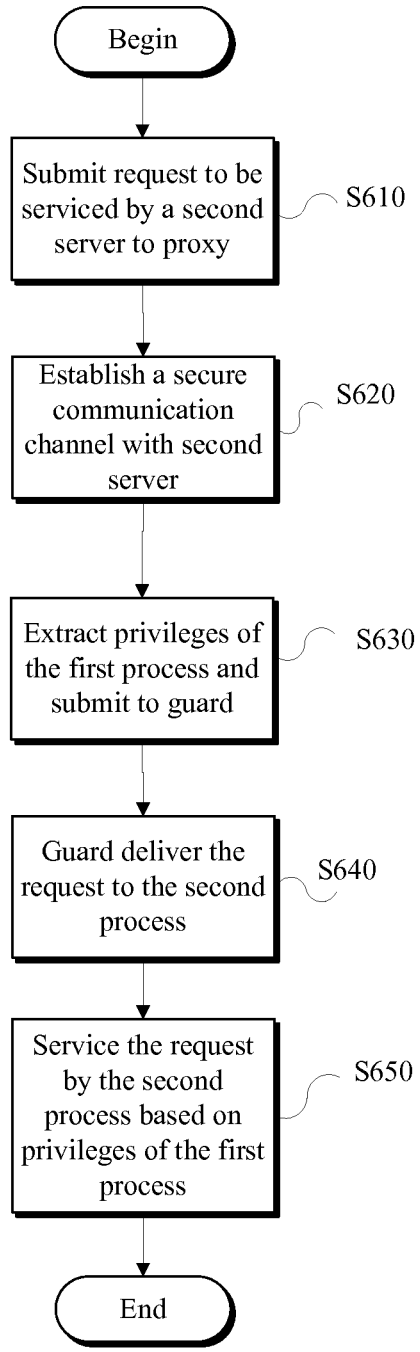

Referring to FIGS. 3A, 3B and 4C, a request processor 220 (e.g., a first process) running on a first server system 120 may attempt to assign the responsibility for servicing a request or any task related to the request to another request process 220 (e.g., a second process) running on a second server system 125. As provided in further detail below, a proxy 330 and a guard 390 may be utilized to maintain the tenant identity associated with the request during the hand-off process between the first and the second server systems. Optionally, proxy 330 and guard 390 may run on the first server system 120 and the second server system 125, respectively, or on other computing systems connected thereto.

In one embodiment, the request may be submitted by the first process, running on server system 120, to the second process, running on server system 125, through the proxy 330 in communication with the guard 390 (S610). Proxy 330 may establish a trusted communication channel (e.g., using a virtual private network (VPN) or privileged ports) with the second server system 125 (S620). The proxy 330 may extract the set of privileges of the first process and send a description of the privileges together with the request associated with the first process to the guard 390 (S630). The guard 390 may deliver the request to a second process (S640) that has the appropriate privileges.

As such, requests submitted to one server system may be distributed among multiple server systems such that the privileges of the requests remain limited to the privileges of the requesting process. That is, if a first process in system 120 was executing with privileges to access specific tenant data, a second process in system 125 will execute with the same privileges. In this regard, when a request or a task submitted by a user associated with a tenant T1 to a first server system 120 is to be transferred to a second server system 125, the proxy 330 determines the privileges of the process which has submitted the request for accessing resources at the first sever system 120, and the guard 390 restricts the privileges of the second process on server 125 using the privileges sent by the proxy 330.

The request and the set of privileges associated with the requesting tenant are then communicated to the second server system 125 by way of a communication channel established between the proxy 330 and the guard 390. The guard 390 affirmatively determines that the communication channel is being initiated via a legitimate source. Once the request and the set of privileges are securely received by the guard 390, the second server system 125 configures a process to service the request submitted by the first server system 120 (S650). Advantageously, the privileges of the second process are limited to the privileges of the first process as communicated by way of the proxy 330.

For communication between each pair of server systems 120, the proxy 330 and the guard 390 may serve as the sole exit and entry points on the source and destination server systems, respectively. In one embodiment, proxy 330 may extracts the tenant privileges by using a kernel mechanism that verifies the identity of the message sender (e.g. via the characteristics of the Unix domain socket where the true identity is confirmed by the kernel). Alternatively, a dedicated communication channel (e.g. using secure tunneling protocol such as SSL or VPN) may be utilized between the proxy 330 and the guard 390 to identify the corresponding tenant privileges by the respective communication channel.

Optionally, the communication between the proxy 330 and the guard 390 may be established via a pre-defined and protected port (e.g. a privileged port) and via a protected network (e.g. with a firewall). In another embodiment, a communication tunnel may be created between the proxy 330 and the guard 390 such that the guard 390 can authenticate the proxy 330 for example using a certificate of a shared secret. Tenant privileges may be identified based on the OS user ID. If the OS user ID used by the first and second server systems 120 and 125 are the same, the proxy 330 may send the OS user ID of the first server system 120 to the guard 390.

The user ID may provide the guard 390 with the required information about the privileges of the first server system 120 allowing the guard 390 to limit the tenant privileges at the second server system 125 to those defined by the proxy 330. In one embodiment, the guard 390 drops (i.e., limits) the privileges of a request processor that is designated to service the request transferred from the first server system 120 to those defined by the proxy 330. Alternatively, the guard 390 may pass the request to a request processor that has the corresponding set of privileges.

In different embodiments, the invention can be implemented either entirely in the form of hardware or entirely in the form of software, or a combination of both hardware and software elements. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 5A:
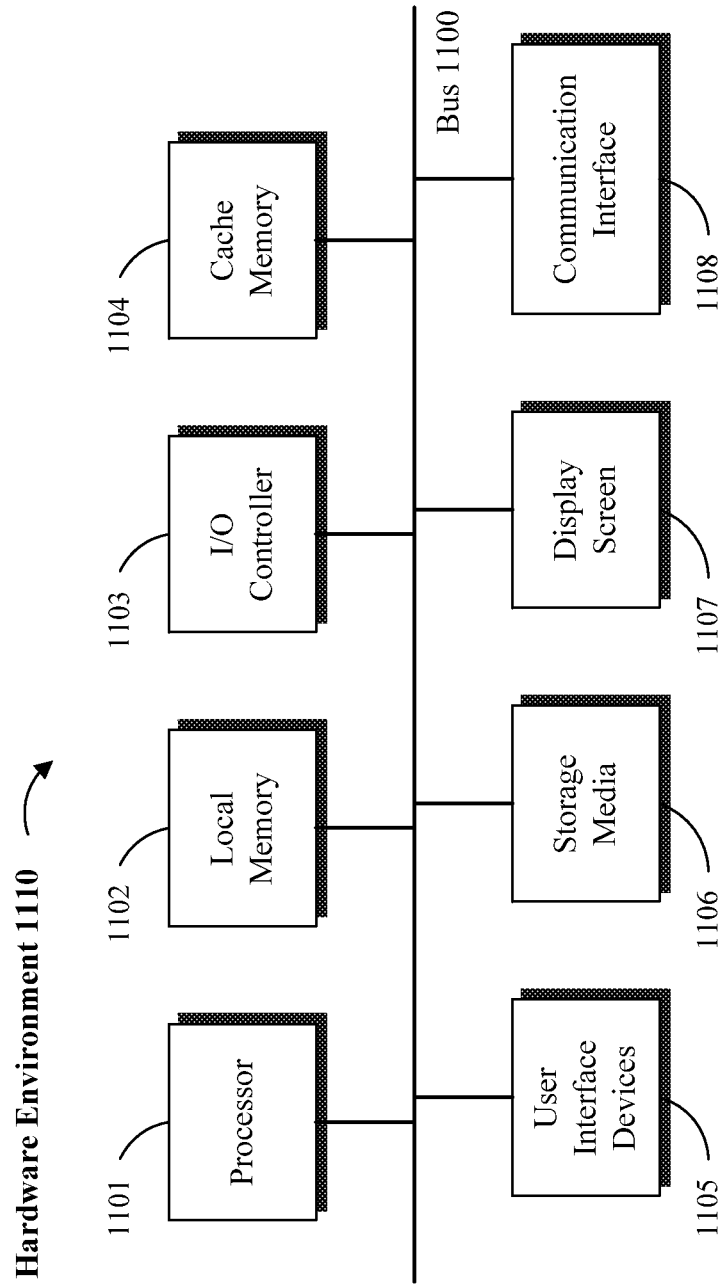
FIGS. 5A and 5B are block diagrams of hardware and software environments in which the disclosed systems and methods may operate, in accordance with one or more embodiments.
Figure 5B:
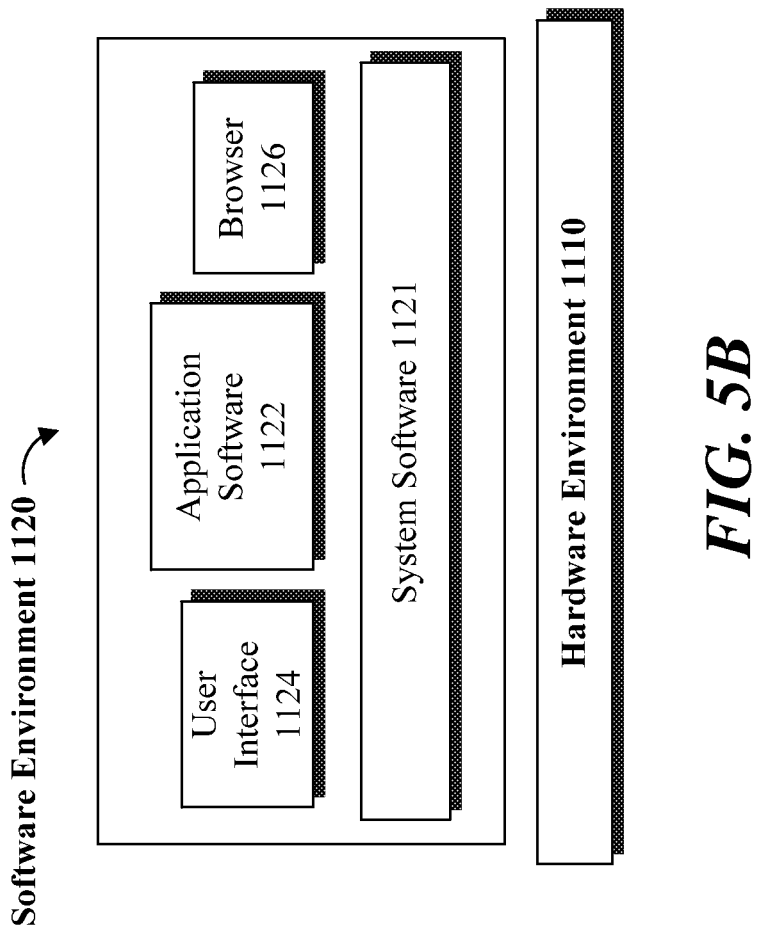

Referring to FIGS. 5A and 5B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 5A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Using the on-demand self-service, a cloud consumer may unilaterally provision computing capabilities, such as server time and network storage, as needed automatically without requiring human interaction with the service's provider. Broad network access capabilities may be available over a network and accessed through standard mechanisms that promote use by heterogeneous thin or thick client platforms (e.g., mobile phones, laptops, and PDAs).

Resource pooling allows the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity capabilities may be rapidly and elastically provisioned, in some cases automatically, to quickly scale out and rapidly released to quickly scale in. To the consumer, the capabilities available for provisioning often appear to be unlimited and may be purchased in any quantity at any time. Measured service allows cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Several service models are available, depending on implementation. Software as a Service (SaaS) provides the capability to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS) provides the capability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) provides the capability to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Several deployment models may be provided. A private cloud provides a cloud infrastructure that is operated solely for an organization. It may be managed by the organization or a third party and may exist on-premises or off-premises. A community cloud provides a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud may provide a cloud infrastructure that is made available to the general public or a large industry group and is owned by an organization selling cloud services. A hybrid cloud provides a cloud infrastructure that is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes. Referring now to FIG. 6A, a schematic of an example of a cloud computing node is shown. Cloud computing node 2010 is one example of a suitable cloud computing node and is not intended to suggest any limitation as to the scope of use or functionality of embodiments described herein. Regardless, cloud computing node 2010 is capable of being implemented and/or performing any of the functionality set forth hereinabove.

In cloud computing node 2010, there is a computer system/server 2012, which is operational with numerous other general purpose or special purpose computing system environments or configurations. Examples of well-known computing systems, environments, and/or configurations that may be suitable for use with computer system/server 2012 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 2012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 2012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6A, computer system/server 2012 in cloud computing node 2010 is shown in the form of a general-purpose computing device. The components of computer system/server 2012 may include, but are not limited to, one or more processors or processing units 2016, a system memory 2028, and a bus 2018 that couples various system components including system memory 2028 to processor 2016.

Bus 2018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 2012 typically includes a variety of computer system readable media. Such media may be any available media that is accessible by computer system/server 2012, and it includes both volatile and non-volatile media, removable and non-removable media. System memory 2028 may include computer system readable media in the form of volatile memory, such as random access memory (RAM) 30 and/or cache memory 32.

Computer system/server 2012 may further include other removable/non-removable, volatile/non-volatile computer system storage media. By way of example, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided.

In some instances, the above components may be connected to bus 2018 by one or more data media interfaces. As will be further depicted and described below, memory 2028 may include at least one program product having a set (e.g., at least one) of program modules that are configured to carry out the functions of one or more embodiments.

Program/utility 2040, having a set (at least one) of program modules 42, may be stored in memory 2028 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of one or more embodiments.

Computer system/server 2012 may also communicate with one or more external devices 2014 such as a keyboard, a pointing device, a display 2024, etc.; one or more devices that enable a user to interact with computer system/server 2012; and/or any devices (e.g., network card, modem, etc.) that enable computer system/server 2012 to communicate with one or more other computing devices. Such communication may occur via I/O interfaces 2022. Still yet, computer system/server 2012 may communicate with one or more networks such as a local area network (LAN), a general wide area network (WAN), and/or a public network (e.g., the Internet) via network adapter 2020.

As depicted, network adapter 2020 communicates with the other components of computer system/server 2012 via bus 2018. It should be understood that although not shown, other hardware and/or software components could be used in conjunction with computer system/server 2012. Examples, include, but are not limited to: microcode, device drivers, redundant processing units, external disk drive arrays, RAID systems, tape drives, and data archival storage systems, etc.

Figure 6B:
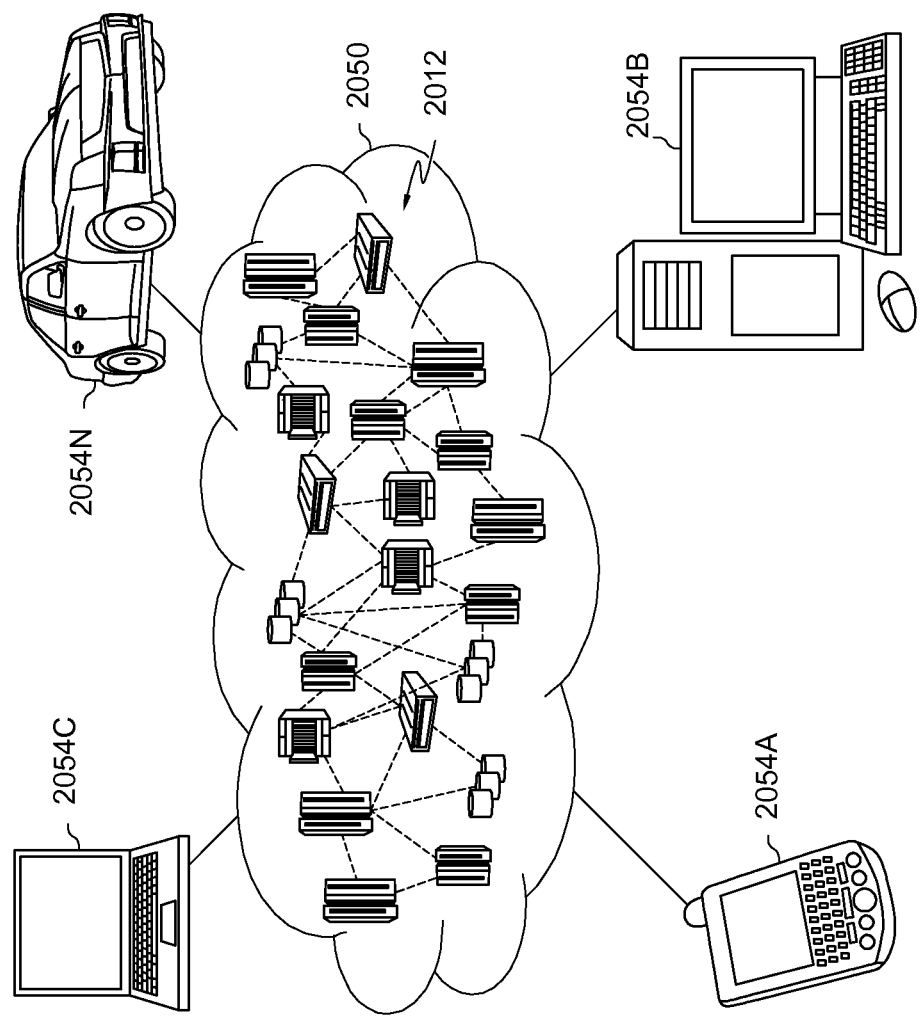

Referring now to FIG. 6B, illustrative cloud computing environment 2050 is depicted. As shown, cloud computing environment 2050 comprises one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate.

Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device.

It is understood that the types of computing devices 54A-N shown in FIG. 6B are intended to be illustrative only and that computing nodes 2010 and cloud computing environment 2050 may communicate with any type of computerized device over any type of network and/or network addressable connection (e.g., using a web browser).

Figure 6C:
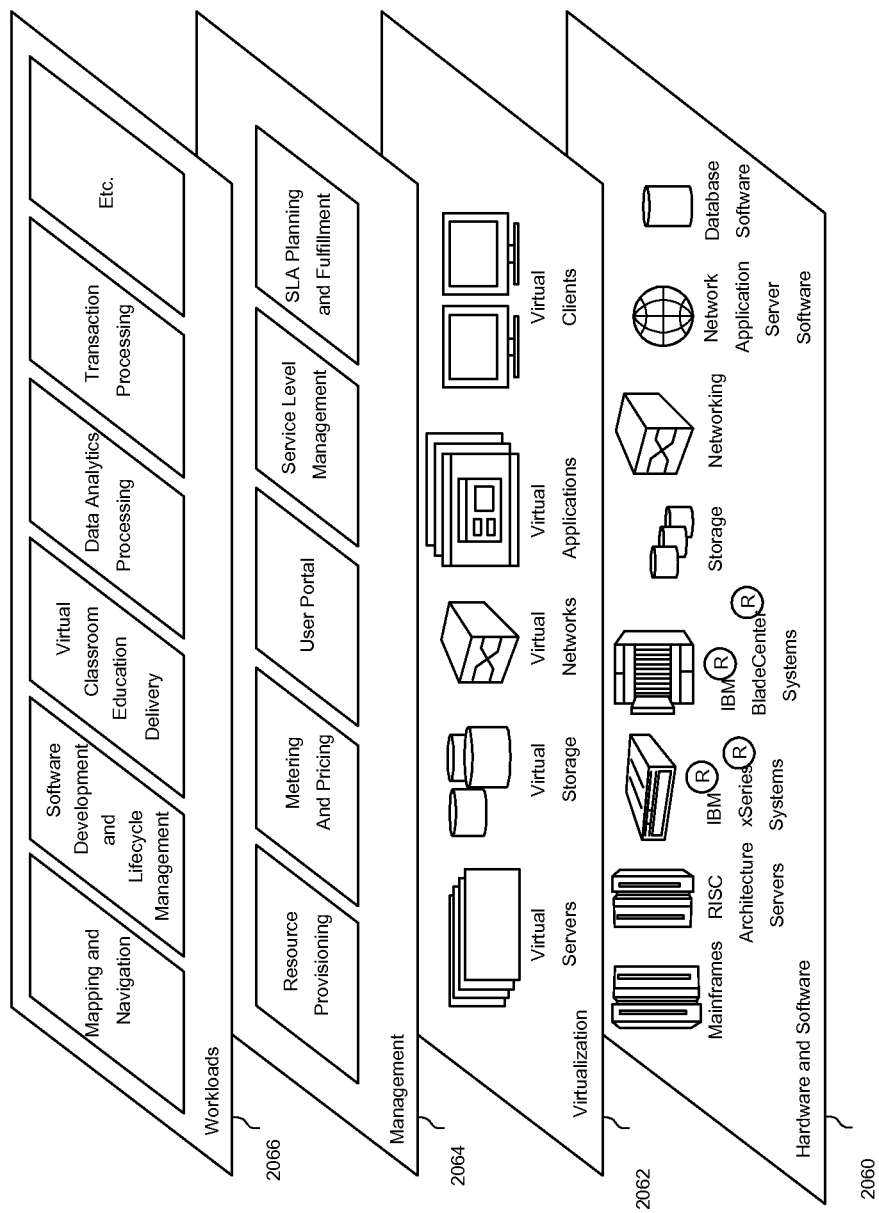

Referring now to FIG. 6C, a set of functional abstraction layers provided by cloud computing environment 2050 (FIG. 6B) is shown. It should be understood in advance that the components, layers, and functions shown in FIG. 6C are intended to be illustrative of one or more embodiments and are not limited thereto. As depicted, the following layers and corresponding functions are provided.

Hardware and software layer 2060 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 2062 provides an abstraction layer from which the following examples of virtual entities may be provided: virtual servers; virtual storage; virtual networks, including virtual private networks; virtual applications and operating systems; and virtual clients. In one example, management layer 2064 may provide the functions described below. Resource provisioning provides dynamic procurement of computing resources and other resources that are utilized to perform tasks within the cloud computing environment.

Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met.

Service Level Agreement (SLA) planning and fulfillment provide pre-arrangement for, and procurement of, cloud computing resources for which a future requirement is anticipated in accordance with an SLA. Workloads layer 2066 provides examples of functionality for which the cloud computing environment may be utilized. Examples of workloads and functions which may be provided from this layer include: mapping and navigation; software development and lifecycle management; virtual classroom education delivery; data analytics processing; transaction processing; etc.

What is claimed is:

1. A method of handling a client request in a hierarchical multi-tenant data storage system, the method comprising:
   processing a request in subtasks, wherein a subtask is executed with a minimal set of privileges associated with a specific subtenant;
   extracting a claimed n-level hierarchy of a tenant and subtenant identities from the request;
   extracting authentication signatures or credentials that correspond to a level in the hierarchy;
   for a first level in the hierarchy, spawning a dedicated subtenant authenticator;
   for a first level in the hierarchy, sending the request to a dedicated subtenant authenticator, wherein the dedicated subtenant authenticator is privileged to validate credentials for a subtenant at only the first level; and
   receiving a confirmation from the dedicated subtenant authenticator, whether the request is authentic.

2. The method of claim 1, wherein in response to receiving a confirmation that the request is authentic, the request is forwarded to one or more entities having a dedicated subtenant privilege for accessing a subset of the subtenant resources.

3. A computer system comprising:
   one or more processors;
   one or more non-transitory computer readable storage media;
   computer program instructions;
   the computer program instructions being stored on the one or more non-transitory computer readable storage media;
   the computer program instructions comprising instructions to:
     process a request in subtasks, wherein a subtask is executed with a minimal set of privileges associated with a specific subtenant;
     extract a claimed n-level hierarchy of a tenant and subtenant identities from the request
     extract authentication signatures or credentials that correspond to a level in the hierarchy;
     for a first level in the hierarchy, spawn a dedicated subtenant authenticator;

for the first level in the hierarchy, send the request to dedicated subtenant authenticator, wherein the dedicated subtenant authenticator is privileged to validate credentials for a subtenant at only the first level; and receive a confirmation from the dedicated subtenant authenticator, whether the request is authentic.

4. The system of claim 3, wherein in response to receiving a confirmation that the request is authentic, the request is forwarded to one or more entities having a dedicated subtenant privilege for accessing a subset of the subtenant resources.

5. A computer program product comprising logic code embedded in a non-transitory data storage medium for maintaining resource isolation in a multi-tenant computing system, wherein execution of the logic code on a computer causes the computer to:

process a request in subtasks, wherein a subtask is executed with a minimal set of privileges associated with a specific subtenant;

extract a claimed n-level hierarchy of a tenant and subtenant identities from the request;

extract authentication signatures or credentials that correspond to a level in the hierarchy;

for a first level in the hierarchy, spawn a dedicated subtenant authenticator;

for the first level in the hierarchy, send the request to dedicated subtenant authenticator, wherein the dedicated subtenant authenticator is privileged to validate credentials for a subtenant at only the first level; and receive a confirmation from the dedicated subtenant authenticator, whether the request is authentic.

6. The computer program product of claim 5, wherein in response to receiving a confirmation that the request is authentic, the request is forwarded to one or more entities having a dedicated subtenant privilege for accessing a subset of the subtenant resources.

* * * * *